United States Patent
Whitehead

(10) Patent No.: US 11,945,986 B2
(45) Date of Patent: Apr. 2, 2024

(54) BIODEGRADABLE LIGHT WAND

(71) Applicant: NYOKA DESIGN CORP., Courtenay (CA)

(72) Inventor: Paige Whitehead, Victoria (CA)

(73) Assignee: Nyoka Design Corp., Victoria (CA)

( * ) Notice: Subject to any disclaimer, the term of this patent is extended or adjusted under 35 U.S.C. 154(b) by 702 days.

(21) Appl. No.: 17/054,153

(22) PCT Filed: Jan. 14, 2019

(86) PCT No.: PCT/CA2019/000003
§ 371 (c)(1),
(2) Date: Nov. 9, 2020

(87) PCT Pub. No.: WO2019/213734
PCT Pub. Date: Nov. 14, 2019

(65) Prior Publication Data
US 2021/0087464 A1  Mar. 25, 2021

(30) Foreign Application Priority Data
May 9, 2018  (CA) ................................ CA 3004436

(51) Int. Cl.
*C09K 11/07* (2006.01)
*B09C 1/10* (2006.01)
(Continued)

(52) U.S. Cl.
CPC .............. *C09K 11/07* (2013.01); *B09C 1/105* (2013.01); *C09B 61/00* (2013.01); *F21K 2/06* (2013.01); *Y02W 90/10* (2015.05)

(58) Field of Classification Search
CPC ........................... F21K 2/00–08; C09K 11/07
See application file for complete search history.

(56) References Cited

U.S. PATENT DOCUMENTS

| 5,876,995 A | 3/1999 | Bryan |
| 6,113,886 A | 9/2000 | Bryan |
| (Continued) | | |

FOREIGN PATENT DOCUMENTS

| CA | 2394988 A1 | 6/2001 |
| CA | 2165379 C | 9/2001 |
| (Continued) | | |

OTHER PUBLICATIONS

Dan Ebenal, "UVic student aglow over new invention" Jan. 14, 2018, 3 pages, Victoria News, https://www.vicnews.com/news/uvic-student-aglow-over-new-invention/.
(Continued)

*Primary Examiner* — Mariceli Santiago

(57) ABSTRACT

A biodegradable light wand is provided, the light wand including: a light transmitting tube comprising a natural hydrocolloid, the tube having a sidewall, a second port and a first port, to define a bore; a first bioluminescence tablet which comprises a light producing enzyme and a second bioluminescence tablet which comprises a bioluminescence-generating molecule, both housed in the bore; a bio-plug in the first port, the bio-plug sized to seal the first port, the bio-plug comprising a beeswax, charcoal, sometimes fungal spores, and a substrate; and a cap, the cap sized to seal the second port, the cap is configured in the second port. Together these components form a biodegradable, non-toxic alternative to plastic chemiluminescent glow sticks.

20 Claims, 7 Drawing Sheets

(51) Int. Cl.
*C09B 61/00* (2006.01)
*F21K 2/06* (2006.01)

(56) References Cited

U.S. PATENT DOCUMENTS

| | | | |
|---|---|---|---|
| 6,152,358 | A | 11/2000 | Bryan |
| 6,232,107 | B1 | 5/2001 | Bryan et al. |
| 6,247,995 | B1 | 6/2001 | Bryan |
| 6,572,244 | B1 | 6/2003 | Clark |
| 6,663,255 | B1 | 12/2003 | Carito |
| 7,052,631 | B2 | 5/2006 | Cranor |
| 7,109,315 | B2 | 9/2006 | Bryan et al. |
| 8,128,839 | B2 | 3/2012 | Xu |
| 8,282,858 | B2 | 10/2012 | Agrawal et al. |
| 8,833,954 | B2 | 9/2014 | Griffin |
| 2005/0158526 | A1 | 7/2005 | Ino et al. |
| 2006/0053505 | A1 | 3/2006 | Bryan |
| 2008/0103232 | A1 | 5/2008 | Lake et al. |
| 2008/0286856 | A1* | 11/2008 | Park .................. F21K 2/06 435/283.1 |
| 2009/0289237 | A1 | 11/2009 | Cranor |
| 2013/0208444 | A1 | 8/2013 | Green |
| 2014/0003026 | A1* | 1/2014 | Friedson ............ F21K 2/06 362/34 |
| 2014/0192512 | A1 | 7/2014 | Bushee |
| 2015/0233531 | A1 | 8/2015 | Nagel |

FOREIGN PATENT DOCUMENTS

| | | |
|---|---|---|
| CA | 2245594 C | 4/2003 |
| CA | 2358376 A1 | 4/2003 |
| CA | 2349160 C | 11/2004 |
| CA | 2261679 C | 11/2005 |
| CA | 2622816 A1 | 3/2007 |
| CA | 2194325 C | 11/2007 |
| CA | 2670527 A1 | 6/2008 |
| CA | 2699604 A1 | 4/2009 |
| CA | 2253797 C | 8/2009 |
| CA | 2417284 C | 11/2009 |
| CA | 2733512 A1 | 2/2010 |
| CA | 2960058 C | 5/2019 |
| EP | 0879383 B1 | 5/2003 |
| ES | 2497340 A1 * | 9/2014 ............. C09K 11/06 |
| FR | 673306 A | 1/1930 |
| FR | 2683122 A1 | 5/1993 |
| KR | 102106928 B1 | 5/2020 |
| WO | 9729319 A2 | 8/1997 |
| WO | 1997029319 A2 | 8/1997 |
| WO | 2015120332 A1 | 8/2015 |
| WO | 2016079724 A2 | 5/2016 |

OTHER PUBLICATIONS

Jody Paterson, "Making littering feel good" Apr. 12, 2018, 4 pages, University of Victoria, https://www.uvic.ca/international/home/news/stories/2018+nyoka-light-wand-whitehead+news.

Levi Hildebrand, "The World's First Eco-Friendly Glowsitck !! " May 1, 2018, YouTube, 11 minutes and 38 seconds, https://www.youtube.com/watch?v=iaaWbnftFMw.

Requisition and Search Report, Canadian Intellectual Property Office, dated Aug. 20, 2018 (2 pgs) and May 31, 2018 (2 pgs) respectively.

International Preliminary Report for International Patent Application No. PCT/CA2019/000003, dated Nov. 10, 2020 (4 pages).

International Search Report and Written Opinion for International Patent Application No. PCT/CA2019/000003, dated Apr. 3, 2019 (6 pages).

* cited by examiner ained in close association but separated from each other by a barrier medium to prevent interaction before the same is desired. When the barrier medium is ruptured, or otherwise broken down, either deliberately or unintentionally, a reaction occurs between the chemiluminescent agent and the activating agent with the emission of visible light, without, however, the generation of any appreciable amount of heat. It is recommended that the outer material be glass or a plastic such as polyethylene, ethyl cellulose, vinylidene chloride. The material used is to be impermeable to water, moisture vapor and air. The chemicals used in the light wand and the outer material in which the chemicals are held are all non-biodegradable and are not recyclable. They create garbage at the site if they are dropped.

BIODEGRADABLE LIGHT WAND

CROSS-REFERENCE TO RELATED APPLICATIONS

The present application is a § 371 National Phase Entry of PCT Application No. PCT/CA2019/0000031, filed Jan. 14, 2019, claiming the benefit of priority of Canadian Patent Application No. 3004436, filed May 9, 2018, now issued Canadian Patent No. 3004436, the entireties and content of which are incorporated by reference in to this application.

BACKGROUND

Technical Field

The embodiments herein particularly relate to light wand that produces light through bioluminescence. The embodiments herein also relate to a light wand comprising an agar-based casing with a pair of capsules therein that result in bioluminescence upon hydrating, and later, dissolution of the agar-based casing.

Description of the Related Art

Glow Sticks are sold at many events, such as music festivals. It is estimated that 100 million of these glow sticks are sold a year, all of which end up in the garbage, creating unnecessary waste. Further, these festivals impact directly on the festival environment, not just through garbage being left at the site, but through damage to the turf.

An example of a glow stick is disclosed U.S. Pat. No. 3,774,022. The invention relates to a packaged luminescent material, and more particularly to a combined package of a chemiluminescent agent as the "fuel," and an activating agent therefore, wherein the fuel and activating agent are maintained in close association but separated from each other by a barrier medium to prevent interaction before the same is desired. When the barrier medium is ruptured, or otherwise broken down, either deliberately or unintentionally, a reaction occurs between the chemiluminescent agent and the activating agent with the emission of visible light, without, however, the generation of any appreciable amount of heat. It is recommended that the outer material be glass or a plastic such as polyethylene, ethyl cellulose, vinylidene chloride. The material used is to be impermeable to water, moisture vapor and air. The chemicals used in the light wand and the outer material in which the chemicals are held are all non-biodegradable and are not recyclable. They create garbage at the site if they are dropped.

Biodegradable containers have been known for many years. An example of a biodegradable container is disclosed in U.S. Pat. No. 5,180,765, which discloses environmentally biodegradable compositions of poly(lactic acid) plasticized with lactic acid, D-lactide, L-lactide, meso D, L-lactide, racemic D, L-lactide, oligomers of lactic acid, oligomers of lactide, derivatives of oligomers of lactic acid, or various mixtures thereof; the compositions are suitable replacements of thermoplastic polymer compositions; the compositions are useful for pliable films and other packaging applications conventionally served by polyethylene and other nondegradable thermoplastics; homopolymers or copolymers of D-lactic acid, L-lactic acid, D-lactide, L-lactide, meso D, L-lactide, and/or racemic D, L-lactide having properties similar to other known polymers may be prepared by varying the ratios of monomer and polymerization conditions, the amount and type of plasticizer in the polymer and process conditions; additives and subsequent treatment are also used to modify properties. While these containers are biodegradable, they do not degrade quickly.

More recently, United States Patent Application 20160324207 discloses an edible material that may be made of liquid, sugar, and one or more hydrocolloids. The edible material may be used to form edible cups, containers, and the like and may be capable of holding hot or cold liquids for extended periods of time and have an extended shelf life. The composition forming the edible material may further be suitable for 3D printing 3D edible applications.

Bioluminescence has been used as a research tool and more recently, in novelty items. U.S. Pat. No. 6,436,682 discloses isolated and purified nucleic acid molecules that encode a luciferase from Renilla mulleri, Gaussia and Pleuromamma, and the proteins encoded thereby are provided. Isolated and purified nucleic acids encoding green fluorescent proteins from the genus Renilla and Ptilosarcus, and the green fluorescent proteins encoded thereby are also provided. Compositions and combinations comprising the green fluorescent proteins and/or the luciferase are further provided. These are used in diagnostics, high throughput screening and novelty items.

Hence there is a need for a biodegradable light wand that utilizes bioluminescence as the light source and which contributes to environmental remediation.

The above-mentioned shortcomings, disadvantages and problems are addressed herein and which will be understood by reading and studying the following specification.

OBJECTIVES OF THE EMBODIMENTS

The primary objective of the embodiment herein is to provide a biodegradable light wand that utilizes bioluminescence as the light source and which contributes to environmental remediation Another object of the embodiment herein is to provide a biodegradable light wand outer shell of the light wand degrades quickly.

Yet another object of the embodiment herein is to provide a biodegradable light wand comprising a cap that could be retained by the user as a souvenir.

Yet another object of the embodiment herein is to provide a biodegradable light wand comprising a dried plug of mycelium-inoculated substrate.

Yet another object of the embodiment herein is to provide a biodegradable light wand comprising dried plug included other biologicals, including seeds and prebiotic agents, such as biochar.

Yet another object of the embodiment herein to provide a biodegradable light wand comprising a cap sealed to the shell with beeswax.

These objects and the other advantages of the embodiments herein will become readily apparent from the following detailed description taken in conjunction with the accompanying drawings.

SUMMARY

The various embodiments herein provide a biodegradable light wand that utilizes bioluminescence as the light source and which contributes to environmental remediation. The biodegradable light wand outer shell of the light wand degrades quickly.

According to one embodiment herein, a biodegradable light wand comprises a light transmitting tube, a first bioluminescence tablet, a second bioluminescence tablet, a bio-plug in the first port, a cap and a biodegradable vessel with a releasable closure. The light transmitting tube comprises a first port, a second port and a sidewall between the first port and the second port to define a bore. The first bioluminescence tablet comprises a light producing enzyme. The second bioluminescence tablet comprises a bioluminescence-generating system. The first bioluminescence tablet and the second bioluminescence tablet are both housed in the bore. The bio-plug is sized to seal the first port. The bio-plug comprises a fungal mycelium, beeswax, and a substrate. The cap is sized to seal the second port, and the cap is configured in the second port and the biodegradable vessel comprises a fluid, and wherein the fluid comprises at least one plant-based pigment.

According to one embodiment herein, the light transmitting tube is compostable. The light transmitting tube comprises a natural hydrocelluloid. The bio-plug further comprises a plurality of seeds. The seeds are grass seeds. The beeswax is used to seal the bio-plug in the first port of the light transmitting tube.

According to one embodiment herein, the cap is metallic. The cap is second bio-plug. The cap includes a concavity and a biodegradable seal over the concavity. The concavity houses a plurality of seeds. The plurality of seeds are grass seeds. The cap comprises a stalk with an aperture. The biodegradable light wand comprises a strap. The strap retained by the aperture.

According to one embodiment herein, the biodegradable light wand further comprises a plurality of anthocyanin microcapsules in the bore. The light transmitting tube further comprises at least one plant-based pigment. The light transmitting tube further comprising a fluid which is housed in the bore. The biodegradable light wand further comprises a waterproof, friable shell which is housed in the bore and which houses the first and the second bioluminescent tablet.

According to one embodiment herein, a biodegradable light wand kit comprising a biodegradable light transmitting tube, a first bioluminescence tablet which comprises a light producing enzyme, a second bioluminescence tablet which comprises a bioluminescence-generating system, a bio-plug in the first port, a cap and a biodegradable vessel with a releasable closure. The biodegradable-light transmitting tube comprises a first port, a second port and a sidewall there between to define a bore. The first bioluminescence tablet and the second bioluminescence tablet are placed in the bore. The bio-plug sized to seal the first port, the bio-plug comprising a fungal mycelium and a substrate. The cap has a size to seal the second port, the cap is configured in the second port. The biodegradable vessel comprises a fluid and wherein the fluid comprises at least one plant-based pigment; and instructions manual, and wherein the biodegradable light transmitting tube comprises a natural hydrocolloid.

According to one embodiment herein, a biodegradable container for use with a light source comprising a light transmitting tube, a bio-plug in the first port and a cap. The light transmitting tube comprises a first port, a second port and a sidewall there between to define a bore. The bio-plug has a size to seal the first port. The bio-plug comprises a fungal mycelium, beeswax, and a substrate. The cap has a size to seal the second port. The cap is configured in the second port.

According to one embodiment herein, the container is compostable. The light transmitting tube comprises natural hydrocolloid. The bio-plug comprises a plurality of seeds. The plurality of seeds are grass seeds. The beeswax is used to seal the bio-plug in the first port of the light transmitting tube. The cap is metallic. The cap comprises a stalk with an aperture. The biodegradable light wand comprises a strap. The strap retained by the aperture. The cap comprises a concavity and a biodegradable seal over the concavity.

According to one embodiment herein, the present technology is a biodegradable light wand that utilizes bioluminescence as the light source, which when expended, contributes to environmental remediation. The outer shell of the light wand is made from a natural hydrocolloidal material, which, when exposed to fluid, swells and degrades quickly, for example, within a day. It is compostable. The light wand includes a cap that can be retained by the user as a souvenir. The light wand includes a dried plug of mycelium-inoculated substrate, which upon hydration, begins to grow. The plug further includes other biologicals, including seeds and prebiotic agents, such as biochar. These biologicals contribute to site remediation. The cap is releasably sealed to the shell with beeswax.

According to one embodiment herein, a biodegradable light wand is provided, the light wand including: a light transmitting tube comprising a first port, a second port and a sidewall there between to define a bore; a first bioluminescence tablet which comprises a light producing enzyme and a second bioluminescence tablet which comprises a bioluminescence-generating system, both housed in the bore; a bio-plug in the first port, the bio-plug sized to seal the first port, the bio-plug comprising a fungal mycelium and a substrate; and a cap, the cap sized to seal the second port, the cap releasably located in the second port.

According to one embodiment herein, in the light wand, the tube may be compostable.

According to one embodiment herein, in the light wand, the tube may comprise a natural hydrocolloid.

According to one embodiment herein, in the light wand, the bio-plug may further comprise a plurality of seeds.

According to one embodiment herein, in the light wand, the plurality of seeds may be grass seeds.

According to one embodiment herein, the biodegradable light wand may further comprise a beeswax seal for sealing the bio-plug in the first port of the tube.

According to one embodiment herein, in the light wand, the cap may be metallic.

According to one embodiment herein, in the light wand, the cap may include a logo.

According to one embodiment herein, in the light wand, the cap may include a concavity and a biodegradable seal over the concavity.

According to one embodiment herein, in the light wand, the concavity may house a plurality of seeds.

According to one embodiment herein, in the light wand, the plurality of seeds may be grass seeds.

According to one embodiment herein, in the light wand, the cap may include a stalk with an aperture there through.

According to one embodiment herein, the biodegradable light wand may further comprise a strap, the strap retained by the aperture.

According to one embodiment herein, in the light wand, the cap may be a second bio-plug.

According to one embodiment herein, the biodegradable light wand may further comprise a plurality of anthocyanin microcapsules in the bore.

According to one embodiment herein, in the light wand, the tube may further comprise at least one plant-based pigment.

According to one embodiment herein, the biodegradable light wand may further comprise a fluid which is housed in the bore.

According to one embodiment herein, the biodegradable light wand may further comprise a waterproof, friable shell which is housed in the bore and which houses the first and the second bioluminescent tablet.

According to one embodiment herein, a kit is provided, the kit including: a biodegradable, light transmitting tube, the tube having first port, a second port and a sidewall there between to define a bore, a first bioluminescence tablet which comprises a light producing enzyme and a second bioluminescence tablet which comprises a bioluminescence-generating system, both housed in the bore, a bio-plug in the first port, the bio-plug sized to seal the first port, the bio-plug comprising a fungal mycelium and a substrate, and a cap, the cap sized to seal the second port, the cap releasably located in the second port; a biodegradable vessel with a releasable closure; a fluid which is in the biodegradable vessel, the fluid including at least one plant-based pigment; and instructions.

According to one embodiment herein, in the kit, the tube may comprise a natural hydrocolloid.

According to one embodiment herein, a biodegradable container for use with a light source is provided, the container including: a light transmitting tube, the tube comprising a first port, a second port and a sidewall there between, to define a bore; a bio-plug in the first port, the bio-plug sized to seal the first port, the bio-plug comprising a fungal mycelium and a substrate; and a cap, the cap sized to seal the second port, the cap releasably located in the second port.

According to one embodiment herein, in the biodegradable container, the container may be compostable.

According to one embodiment herein, in the biodegradable container, the tube may comprise a natural hydrocolloid.

According to one embodiment herein, in the biodegradable container, the bio-plug may further comprise a plurality of seeds.

According to one embodiment herein, in the biodegradable container, the plurality of seeds may be grass seeds.

According to one embodiment herein, the biodegradable container may further comprise a beeswax seal for sealing the bio-plug in the first port of the tube.

According to one embodiment herein, in the biodegradable container, the cap may be metallic.

According to one embodiment herein, in the biodegradable container, the cap may include a logo.

According to one embodiment herein, in the biodegradable container, the cap may include a concavity and a biodegradable seal over the concavity.

According to one embodiment herein, in the biodegradable container, the concavity may house a plurality of seeds.

According to one embodiment herein, in the biodegradable container, the plurality of seeds ay be grass seeds.

According to one embodiment herein, in the biodegradable container, the cap may include a stalk with an aperture there through.

According to one embodiment herein, the biodegradable container may further comprise a strap, the strap retained by the aperture.

According to one embodiment herein, to the biodegradable container, the cap may be a second bio-plug.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
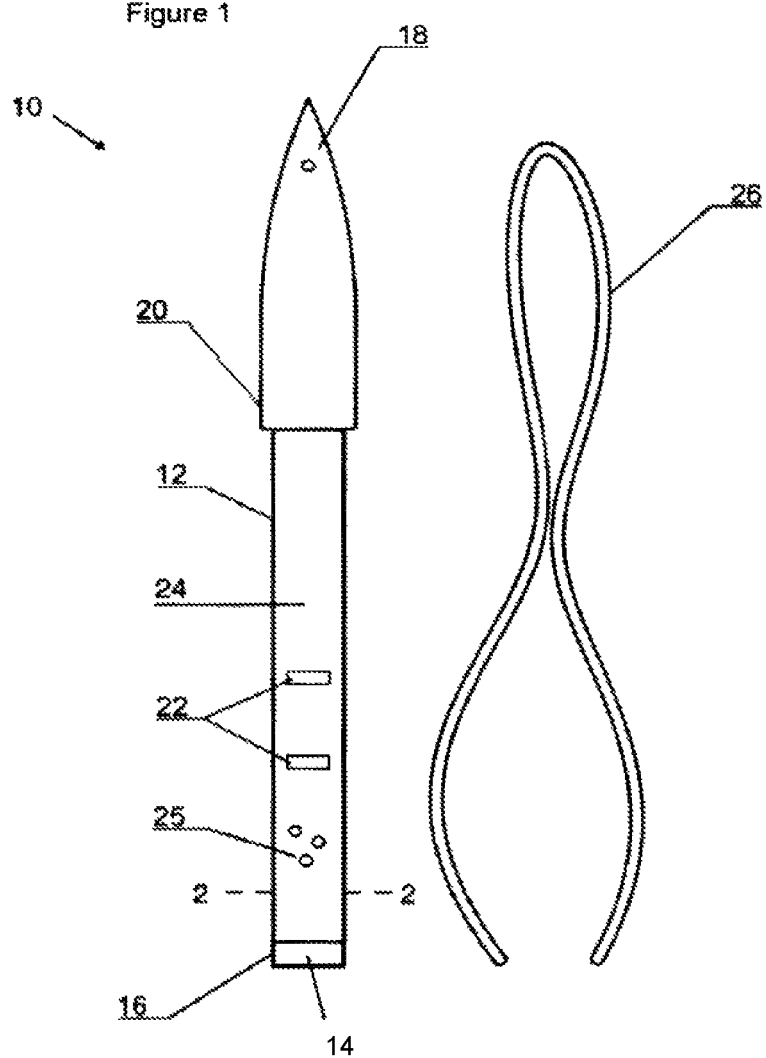
FIG. 1 is a schematic of the light wand of the present technology, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Natural hydrocolloid—in the context of the present technology, a natural hydrocolloid one that is derived from living organisms and is a substance that can gel when combined with water and is defined as a type of mechanical mixture where one substance is dispersed evenly throughout a water-containing liquid. Many hydrocolloids can change their physical behavior and characteristics with the addition or elimination of heat and have the ability to thicken and form gels at low concentrations. Hydrocolloids are generally polysaccharides (complex sugars), and when dissolved in water, forms a layer of water with restricted movement as a result of the water being attracted to the sugar molecules. This restriction of water movement gives hydrocolloids their ability to gel. Different hydrocolloids have different physical properties and different chemical properties such as molecular size, charge, and the distribution and composition of different side chains along the main sugar chain. These differences result in different gelling behaviors. Types of natural hydrocolloids include agar, pectin, carrageenan, gelatin, corn starch, gellan gum, guar gum, gum arabic, isomalt, konjac, lecithin, locust bean gum, maltodextrin, methylcellulose, sodium alginate, xanthan gum, and tapioca. The preferred hydrocolloid is agar.

Natural syrup—in the context of the present technology, a natural syrup is plant-derived and has a dynamic viscosity above 1000 cps at room temperature. According to certain embodiments, the syrup has a dynamic viscosity above 100 cps at room temperature.

The various embodiments herein provide a biodegradable light wand that utilizes bioluminescence as the light source and which contributes to environmental remediation. The biodegradable light wand outer shell of the light wand degrades quickly.

According to one embodiment herein, a biodegradable light wand comprises a light transmitting tube, a first bioluminescence tablet, a second bioluminescence tablet, a bio-plug in the first port, a cap and a biodegradable vessel with a releasable closure. The light transmitting tube comprises a first port, a second port and a sidewall between the first port and the second port to define a bore. The first bioluminescence tablet comprises a light producing enzyme. The second bioluminescence tablet comprises a bioluminescence-generating system. The first bioluminescence tablet and the second bioluminescence tablet are both housed in the bore. The bio-plug is sized to seal the first port. The bio-plug comprises a fungal mycelium, beeswax, and a substrate. The cap is sized to seal the second port, and the cap is configured in the second port and the biodegradable vessel comprises a fluid, and wherein the fluid comprises at least one plant-based pigment.

According to one embodiment herein, the light transmitting tube is compostable. The light transmitting tube comprises a natural hydrocelluloid. The bio-plug further comprises a plurality of seeds. The seeds are grass seeds. The beeswax is used to seal the bio-plug in the first port of the light transmitting tube.

According to one embodiment herein, the cap is metallic. The cap is second bio-plug. The cap includes a concavity and a biodegradable seal over the concavity. The concavity houses a plurality of seeds. The plurality of seeds are grass seeds. The cap comprises a stalk with an aperture. The biodegradable light wand comprises a strap. The strap retained by the aperture.

According to one embodiment herein, the biodegradable light wand further comprises a plurality of anthocyanin microcapsules in the bore. The light transmitting tube further comprises at least one plant-based pigment. The light transmitting tube further comprising a fluid which is housed in the bore. The biodegradable light wand further comprises a water-proof, friable shell which is housed in the bore and which houses the first and the second bioluminescent tablet.

According to one embodiment herein, a biodegradable light wand kit comprising a biodegradable light transmitting tube, a first bioluminescence tablet which comprises a light producing enzyme, a second bioluminescence tablet which comprises a bioluminescence-generating system, a bio-plug in the first port, a cap and a biodegradable vessel with a releasable closure. The biodegradable-light transmitting tube comprises a first port, a second port and a sidewall there between to define a bore. The first bioluminescence tablet and the second bioluminescence tablet are placed in the bore. The bio-plug sized to seal the first port, the bio-plug comprising a fungal mycelium and a substrate. The cap has a size to seal the second port, the cap is configured in the second port. The biodegradable vessel comprises a fluid. and wherein the fluid comprises at least one plant-based pigment; and instructions manual, and wherein the biodegradable light transmitting tube comprises a natural hydrocolloid.

According to one embodiment herein, a biodegradable container for use with a light source comprising a light transmitting tube, a bio-plug in the first port and a cap. The light transmitting tube comprises a first port, a second port and a sidewall there between to define a bore. The bio-plug has a size to seal the first port. The bio-plug comprises a fungal mycelium, beeswax, and a substrate. The cap has a size to seal the second port. The cap is configured in the second port.

According to one embodiment herein, the container is compostable. The light transmitting tube comprises natural hydrocolloid. The bio-plug comprises a plurality of seeds. The plurality of seeds are grass seeds. The beeswax is used to seal the bio-plug in the first port of the light transmitting tube. The cap is metallic. The cap comprises a stalk with an aperture. The biodegradable light wand comprises a strap. The strap retained by the aperture. The cap comprises a concavity and a biodegradable seal over the concavity.

FIG. 1 is a schematic of the light wand of the present technology, according to an embodiment herein. According to one embodiment herein, a light wand, generally referred to as 10 is shown in FIG. 1. It has a tube 12 which is about 6 inches long and ½ inch in diameter, a plug 14 in a first port 16, a cap 18 in a second port 20 and contains paired bioluminescence tablets 22 in the bore 24. Also housed in the bore 24 are anthocyanin microcapsules 25. A leather strap 26 is attached to the light wand 10.

According to one embodiment herein, the tube 12 is made from a water-based liquid, syrup, sugar, and agar. It is compostable. The tube 12 is made from a pre-process (i.e. the starting material prior to beginning the process of making the edible material) mixture of about 25%-50% by weight and all ranges there between, syrup, about 25%-45% by weight and all ranges there between, sugar, and about 0.5%-5% by weight, and all ranges there between, agar and the rest water. In addition to or as an alternative to anthocyanin microcapsules 25, the water-based liquid is preferably a plant-based juice, or includes a plant-based juice, for example, but not limited to beet juice to provide red light, carrot juice to provide yellow light and combinations of juices to provide other colors of light. As would be known to one skilled in the art, it is the plant pigments that impart the color. Plant concentrates may also be used to provide the pigment.

According to one embodiment herein, during the process of making the tube 12, water may be lost to evaporation (e.g., by cooking/boiling and/or by natural or forced drying). Therefore, the water content by weight in the post-cooking form of the tube 12 may be less than the pre-process water content by weight. In some embodiments, up to 35% of the pre-process water amount (i.e., the water portion of the water-based liquid) is lost. In some embodiments, from about 15%-30% of the pre-process water amount is lost. In some embodiments, from about 20%-28% of the pre-process water amount is lost. In some embodiments, from 22%-25% of the pre-process water amount is lost. The post-cooking water loss described above reflects the final water content of the tube 12.

According to one embodiment herein, the anthocyanin microcapsules 25 are a mixture of anthocyanins and maltodextrin, which is then freeze-dried to produce a matrix of maltodextrin and anthocyanin (Degradation kinetics of anthocyanins in freeze-dried microencapsulates from low-bush blueberries (Vaccinium angustifolium Alton) and prediction of shelf-life, Giovana Bonat Celli, Rojin Dibazar, Amyl Ghanem & Marianne Su-Ling Brooks Journal Drying Technology An International Journal Volume 34, 2016—Issue 10 Pages 1175-1184 Published online: 22 Jun. 2016 https://doi.org/10.1080/07373937.2015.1099546.)

According to one embodiment herein, the tube 12, in an alternative embodiment, may be made from one or more of nitrocellulose and bacterial cellulose. It is compostable.

Figure 2:
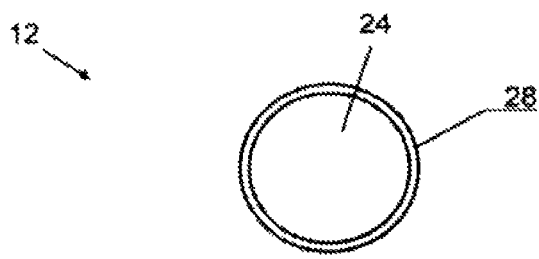
FIG. 2 is cross-sectional view through line 2 in FIG. 1, according to an embodiment herein.

FIG. 2 is cross-sectional view through line 2 in FIG. 1, according to an embodiment herein. As shown in FIG. 2, the sidewall 28 of the tube 12 is about 1/16th inch to about 1/8th inch in width. This width was determined, through experimentation, to provide: sufficient resiliency to resist being crushed or punctured; a sufficient long life span once exposed to fluid for a user to use, for example, 12 hours; and a sufficiently short life span once exposed to fluid to swell and lose shape, for example about 24 to about 48 hours. The tube is manufactured as a length of tubing that is cut to the desired length, which in the preferred embodiment is 6 inches.

According to one embodiment herein, the first tablet of the paired bioluminescence tablets 22 is composed of a light generating enzyme and the second tablet of the paired bioluminescence tablets 22 is composed of a bioluminescence-generating system. In the preferred embodiment the paired bioluminescence tablets are a luciferase-luciferin pair. The paired bioluminescence tablets 22 are provided with a suitable carrier, cofactors and the like as would be known to one skilled in the art. The paired bioluminescence tables 22 are preferably ReLume® from Biotoy® https://www.biotov.com/enitovs/.

Figure 3:
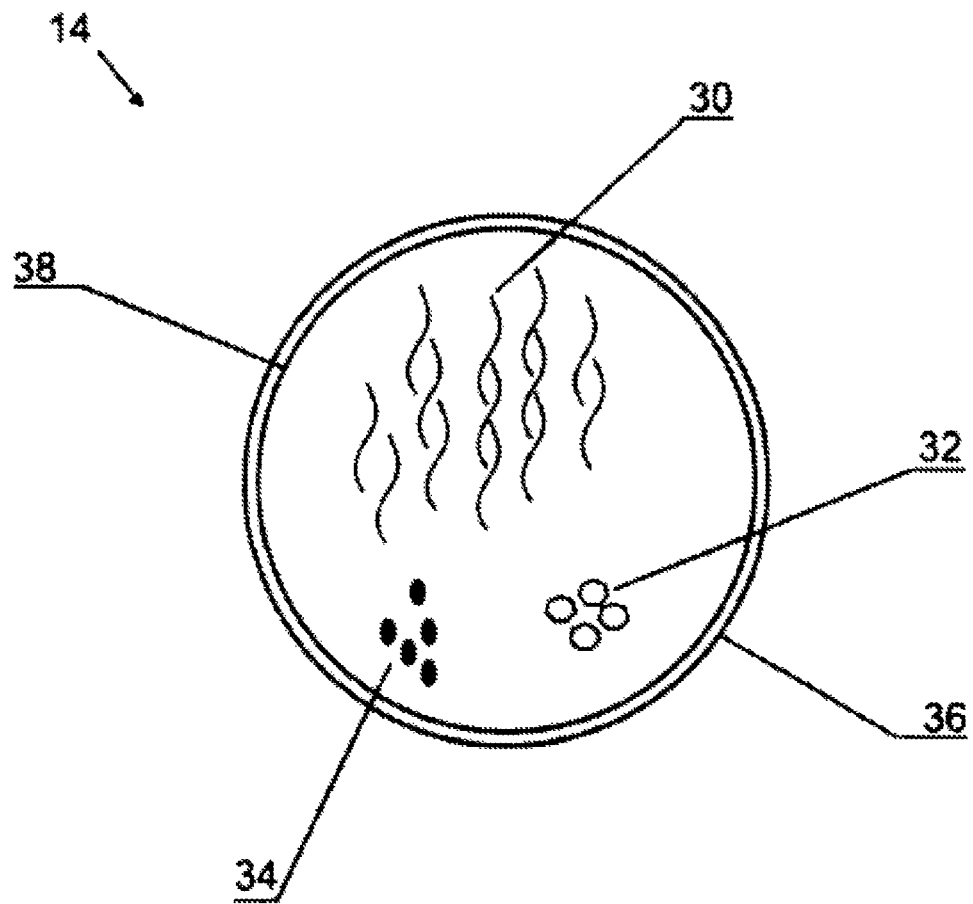
FIG. 3 is a top view of the bio-plug of the light wand of FIG. 1, according to an embodiment herein.

FIG. 3 is a top view of the bio-plug of the light wand of FIG. 1, according to an embodiment herein. As shown in FIG. 3, the plug 14 is a bio-plug. The preferred plug 14 is composed of a fungal mycelium 30 and a substrate 32, for example, but not limited wood chips (including all varieties of wood), coffee chaff, straw, rice husks and grain. The preferred fungus is Ganoderma mycelium. Other fungal mycelium that can be used include, for example, but not limited to Ganoderma lucidum, Ganoderma tsugae, Pleurotus, Glomus intraradices, Glomus mosseae, Glomus aggregatum, Glomus etunicatus, Glomus mosseae, Rhizopogon luteolus, Glomus aggregatum, Rhizopogon amylopogon Glomus etunicatum, Rhizopogon fulvigleba, Glomus deserticola, Pisolithus tinctorius, Glomus monosporum, Suillus granulatus, Glomus clarum, Laccaria bicolor, Paraglomus brasilianum, Laccaria laccata, Gigaspora margarita, Scieroderma cepa, and Scleroderma citrinum. The plug 14 further contains seeds 34, for example, but not limited to, grass seed, as this provides remediation of the grass at the event. The plug 14 has a beeswax layer 36 around the circumference 38 to provide a natural product water-proof seal. The plug 14 is sized to fit snugly in the first port 16 of the tube 12.

Figure 4A:
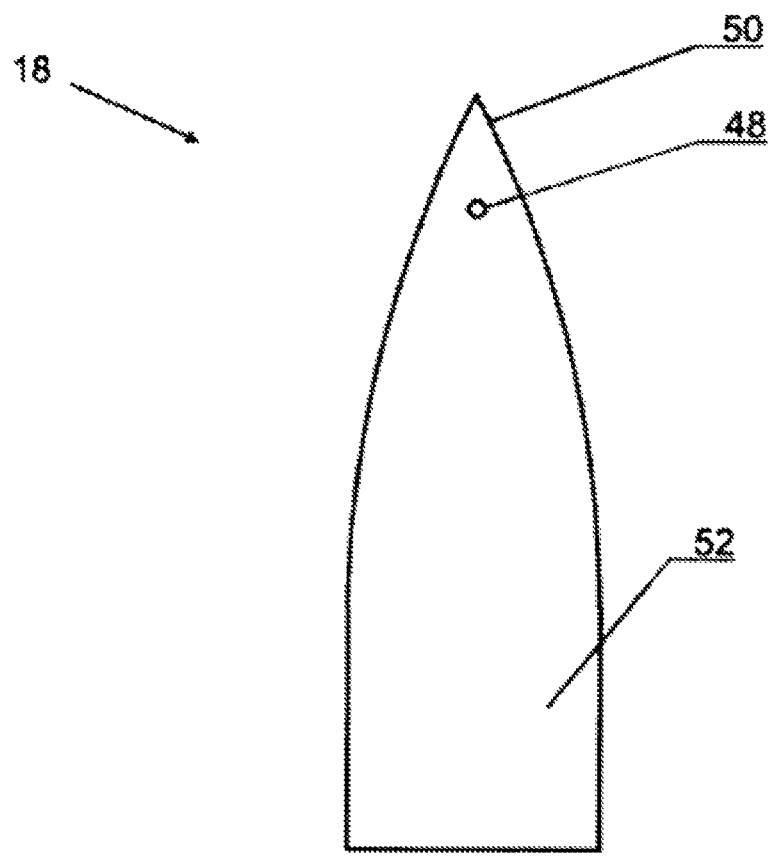
FIG. 4A-FIG. 4B illustrate is a side view of the cap of the light wand and a longitudinal sectional view of the cap of the light wand of FIG. 1 respectively, according to an embodiment herein.
Figure 4B:
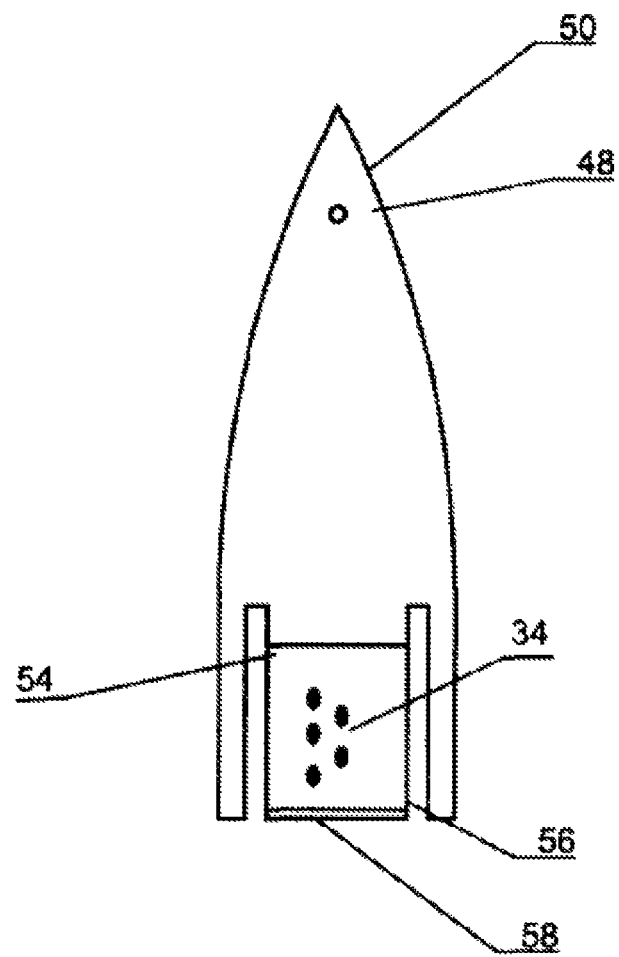

FIG. 4A-FIG. 4B illustrate is a side view of the cap of the light wand and a longitudinal sectional view of the cap of the light wand of FIG. 1 respectively, according to an embodiment herein. The cap 18 is sized to fit snugly in the second port end 20 of the tube 12. As shown in FIG. 4A, the cap includes an aperture 48 on a stalk 50. The leather strap 26 is attached to the aperture 48. The cap 18 is preferably a metal such as pewter and is designed to be a souvenir. It may, include a logo 52 specific to an event. As shown in FIG. 4B, the cap 18 further includes a concavity 54. Seeds 34 are housed in the concavity 54. The mouth 56 of the concavity 54 is sealed with a natural hydrocolloid seal 58. The seal depth is selected to allow the hydrocolloid to be easily ruptured or punctured. The preferred seed 34 is grass seed, as this provides further remediation of the grass at the event.

Figure 5:
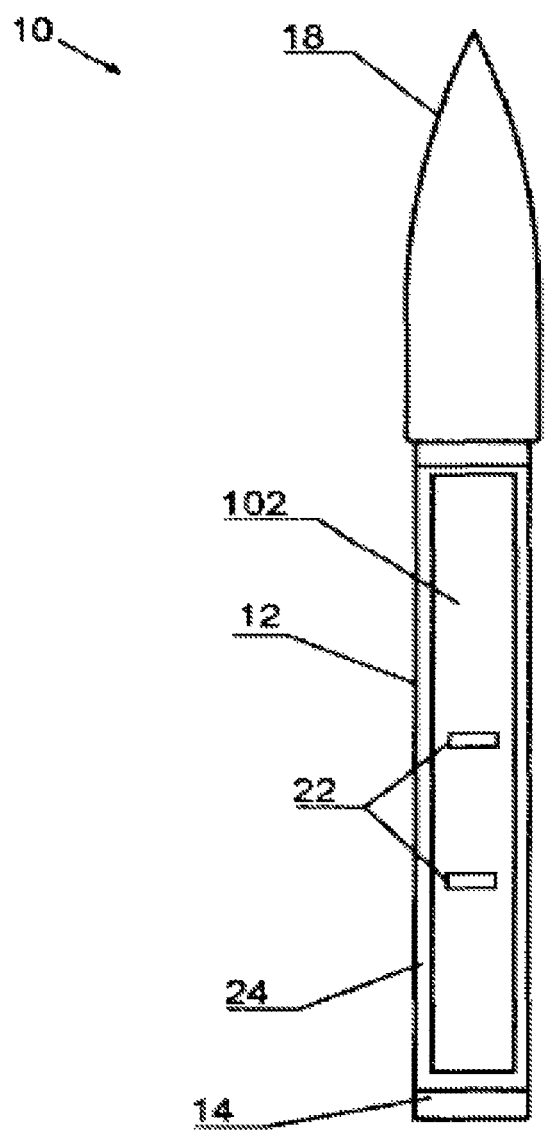
FIG. 5 is a side view of an alternative embodiment of the light wand of FIG. 1, according to an embodiment herein.

FIG. 5 is a side view of an alternative embodiment of the light wand of FIG. 1, according to an embodiment herein. As shown in FIG. 5, the paired bioluminescence tablets 22 are encased in a waterproof, friable shell 102 and the bore 24 of the light wand 10 retains both the water-proof shell 102 and fluid 104. The fluid may include at least one plant-based pigment. It is contemplated that a combination of pigment in the tube 12 and pigment in the fluid 104 may contribute to the color of light emitted.

According to one embodiment herein, the tube 12 is composed of the non-hydrocolloidal SCOBY (symbiotic culture of bacteria and yeast).

Figure 6:
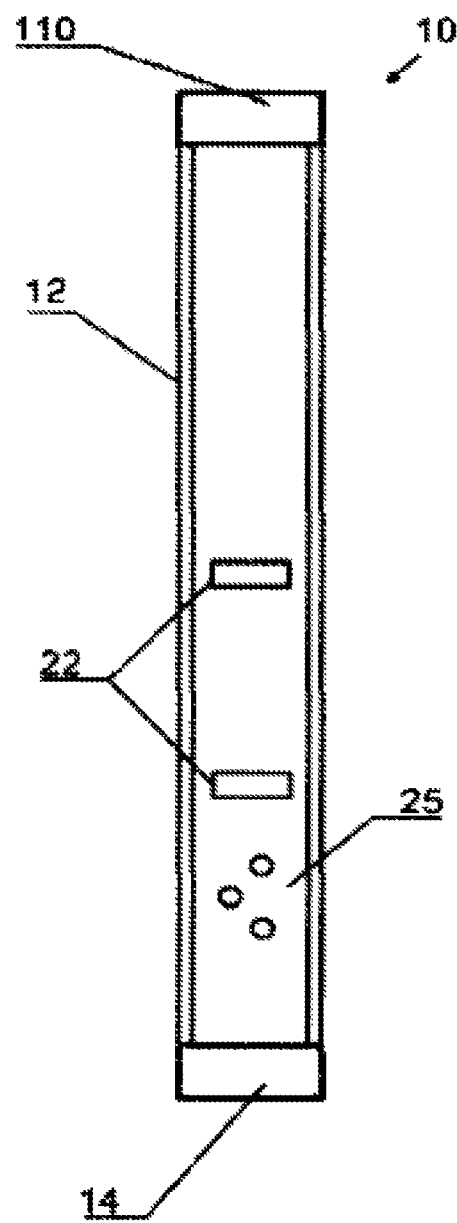
FIG. 6 is a side view of an alternative embodiment of the light wand of FIG. 1, according to an embodiment herein.

FIG. 6 is a side view of an alternative embodiment of the light wand of FIG. 1, according to an embodiment herein. As shown in FIG. 6, the cap is a second plug 110, the plug again being a bio-plug.

Figure 7:
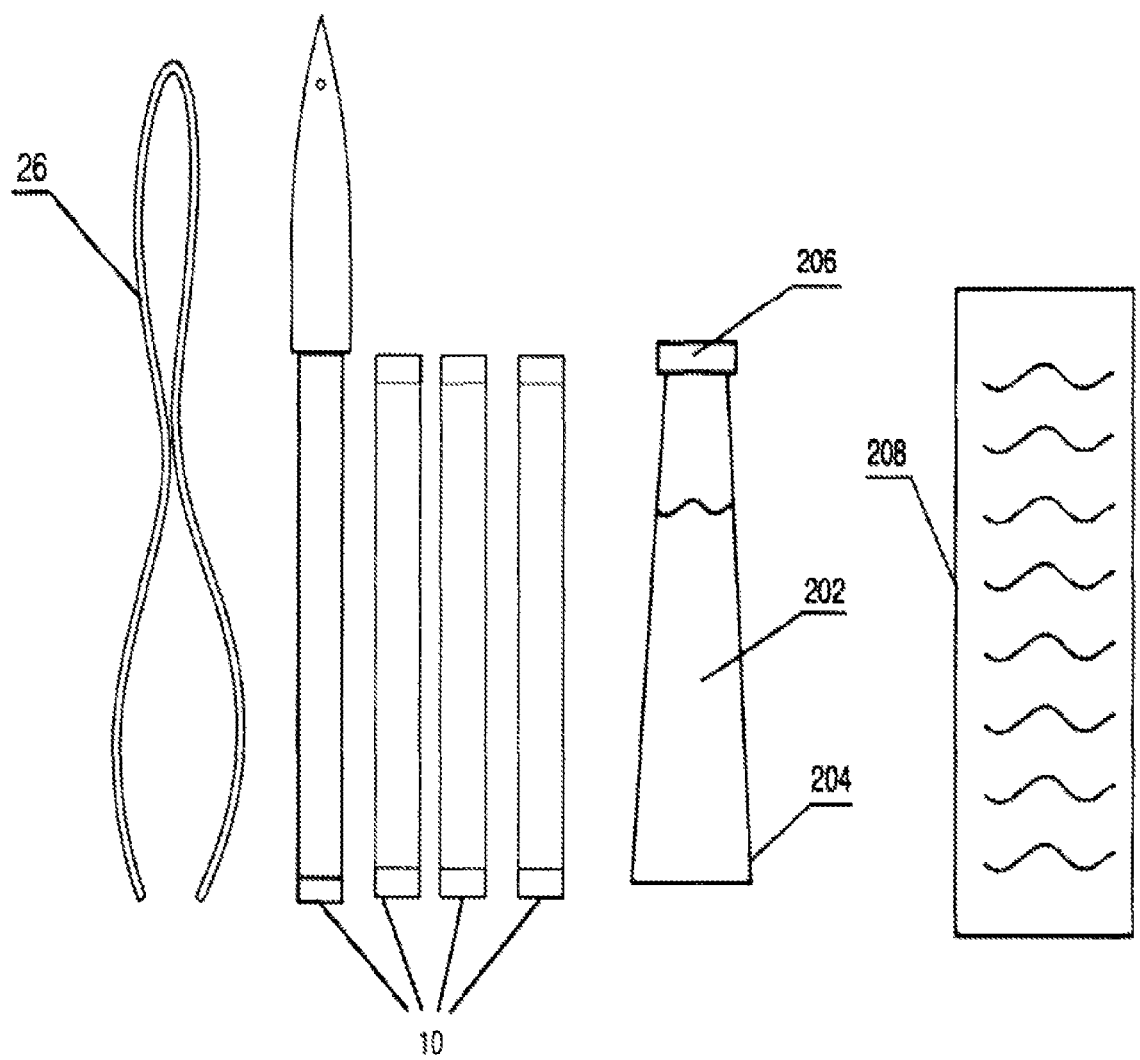
FIG. 7 is a schematic of the kit of the present technology, according to an embodiment herein.

FIG. 7 is a schematic of the kit of the present technology, according to an embodiment herein. As shown in FIG. 7, the light wand 10 may be provided as a kit, generally referred to as 200. The kit 200 includes a plurality of light wands 10, a plant-based pigment colored fluid 202, which is retained in a biodegradable, non-water soluble vessel 204 with a releasable closure 206 and instructions 208.

According to one embodiment herein, the tube 12 is a biodegradable plastic polymer.

According to one embodiment herein, in use, a user removes the cap of the light wand and pours water or other suitable fluid, for example a buffer, or a fluid that includes at least one plant-based pigment into the bore, as needed. In the alternative embodiment, the user shakes the light wand until the water-proof shell is broken. The user then recaps the light wand as needed and gently agitates the fluids to allow for dissolution of the tablets. The bioluminescence is emitted through the tube. The color of the light will depend upon the color of the pigment in the tube and/or in the fluid, if there is any pigment added to the tube or the fluid. Once the bioluminescence is expended, the tube continues to absorb the fluid, becoming distended and distorted. The user may remove the cap if it is metal, or, if it is a second bio-plug, may leave the light wand intact. The bio-plug absorbs the fluid and the mycelium begin to grow and the seeds begin to germinate.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

I claim:

1. A biodegradable light comprising:
   a light transmitting container made of biodegradable materials adapted to retain bioluminescence generating elements operable to cause a light producing bioluminescent reaction that emits light through the light transmitting container, the biodegradable materials and the bioluminescence generating elements being compostable and non-toxic; and
   a biodegradable seal operable to retain the bioluminescence generating elements in the light transmitting container.

2. The biodegradable light of claim 1, comprising a biological operable with water to promote degradation of the light transmitting container.

3. The biodegradable light of claim 2, wherein the biological comprises at least one of
   a seed;
   a prebiotic agent; and
   a fungus.

4. The biodegradable light of claim 1, wherein the biodegradable material comprises one of:
   a natural hydrocolloid;
   a cellulose;
   a sugar;
   a sugar-based material;
   a plant-based material;
   a plant-based pigment; and
   a biodegradable polymer.

5. The biodegradable light of claim 1, wherein the bioluminescence generating elements comprise a fluid and bioluminescence generating reagents that are selectively mixable in the light transmitting tube to cause the light producing bioluminescent reaction.

6. The biodegradable light of claim 5, wherein the bioluminescence generating reagents comprise a light generating enzyme and a bioluminescence-generating molecule.

7. The biodegradable light of claim 1, wherein:
   the light-transmitting container comprises a light-transmitting tube with an opening; and
   the biodegradable seal comprises a biodegradable plug operable to retain the bioluminescence generating elements in the light transmitting tube by plugging the opening.

8. The biodegradable light of claim 7, wherein the biodegradable plug comprises a biological operable with water to promote degradation of the light transmitting container.

9. The biodegradable light of claim 7, wherein the biodegradable plug comprises a fungal mycelium, a beeswax, and a substrate.

10. The biodegradable light of claim 1, wherein the biodegradable material and the bioluminescence generating elements are naturally compostable organic materials.

11. A biodegradable light comprising:
    a light transmitting container made of biodegradable materials; and
    bioluminescence generating elements that are retained in the light transmitting container and operable to cause a light producing bioluminescent reaction that emits light through the light transmitting container,
    the biodegradable materials and the bioluminescence generating elements being compostable and non-toxic,
    the biodegradable materials defining a biodegradable seal that retains the bioluminescence generating elements in the light transmitting tube.

12. The biodegradable light of claim 11, comprising a biological operable with water to promote degradation of the light transmitting container.

13. The biodegradable light of claim 12, wherein:
    the bioluminescence generating elements comprise a fluid and bioluminescence generating reagents that are selectively mixable in the light transmitting container to cause the light producing bioluminescent reaction; and
    each of the biodegradable materials, the bioluminescence generating reagents, the fluid, and the biological are compostable and non-toxic.

14. The biodegradable light of claim 13, wherein the fluid comprises a plant-based pigment.

15. The biodegradable light of claim 13, wherein the bioluminescence generating reagents comprise a light generating enzyme and a bioluminescence-generating molecule.

16. The biodegradable light of claim 15, wherein the biodegradable material and the bioluminescence generating elements are naturally compostable organic materials.

17. The biodegradable light of claim 11, comprising a cap that is:
  operable to retain the bioluminescence generating reagents in the light transmitting container; and
  comprises at least one of a metallic material,
    a logo,
    a stalk with an aperture extending therethrough, and
    a biological operable with water to promote degradation of the light transmitting container.

18. A biodegradable light comprising:
  biodegradable materials containing bioluminescence generating elements operable to cause a light producing bioluminescent reaction that emits light through the biodegradable materials, the biodegradable materials and the bioluminescence generating elements being compostable and non-toxic; and
  a biodegradable seal operable to retain the bioluminescence generating elements in the biodegradable material.

19. The biodegradable light of claim 17, comprising a biological operable with water to promote degradation of the biodegradable light wand.

20. The biodegradable light of claim 17, wherein the biodegradable material comprises an organic material or a biodegradable polymer.

\* \* \* \* \*